Patented Jan. 20, 1953

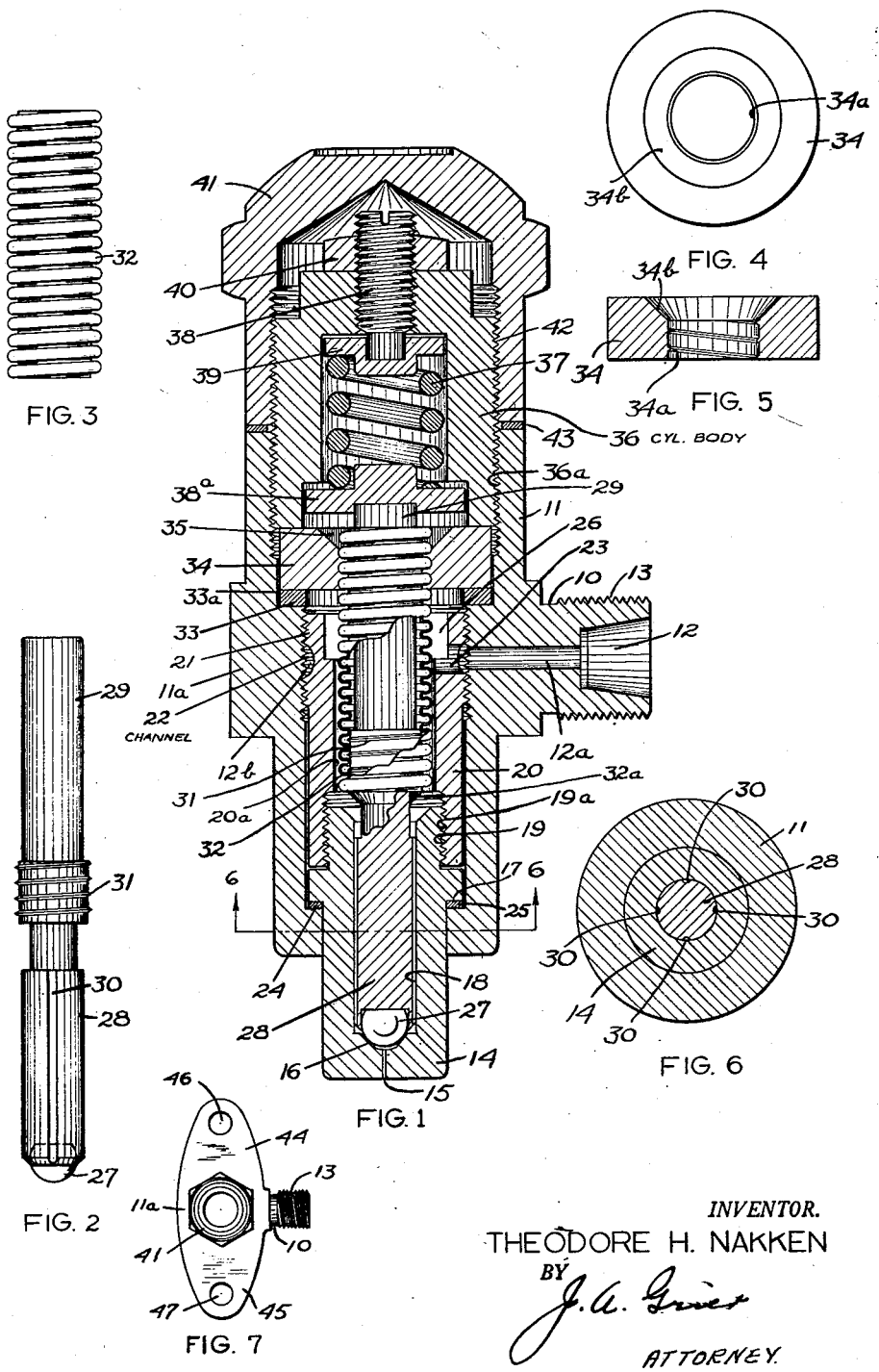
Jan. 20, 1953 — T. H. NAKKEN — 2,626,186
INJECTOR NOZZLE
Filed Aug. 26, 1948
INVENTOR.
THEODORE H. NAKKEN
ATTORNEY

2,626,186

UNITED STATES PATENT OFFICE 2,626,186

INJECTOR NOZZLE

Theodore H. Nakken, New York, N. Y., assignor to Nakken Products and Development Co. Inc., a corporation of Delaware Application August 26, 1948, Serial No. 46,349

8 Claims. (Cl. 299—107.6)

This invention relates to improvements in injector nozzles and has for an object the provision of an injector nozzle in which there is no chance for the fluid being handled to leak, as is the case with nozzles employing pistons, and therefore requiring no drain or return pipe to return fuel to the fuel source.

Another object of the invention is the provision of an injector nozzle which requires no precision lapping of the valve on its seat.

A further object of the invention is the provision of an injector nozzle which can be adjusted to operate at any desired pressure.

Other objects and advantages of the invention will be apparent to those skilled in the art.

Referring to the drawings which are given by way of example to illustrate the invention:

Figure 1 is a vertical section of one form of nozzle for general purpose usage;

Figure 2 is an elevational view of the valve rod before the same is secured to the flexible bellows;

Figure 3 is an elevational view of the retracting bellows employed in the valve of Figure 1;

Figure 4 is a plan view of the bellows holding ring;

Figure 5 is a cross-sectional elevation of the bellows holding ring;

Figure 6 is a cross-sectional view, taken along the lines 6—6 of Figure 1; and

Figure 7 is a plan view on reduced scale of the entire nozzle and its holder.

Referring first to Figure 1, the valve has a body or holder 11. A boss 10 on the body 11 has an exterior threaded portion 13, by means of which a fuel line can be connected to the body. Fuel or other liquid may enter the body via a hole 12 which is adapted to receive a suitable fuel line terminal. Leading from the hole 12 is a passage 12a which communicates with the interior 12b of the nozzle hole. The nozzle tip 14 has a spray opening 15 formed therein. Adjacent to the upper end of the spray hole 15 is a valve seat 16 and communicating therewith is a central bore 18. A shoulder 17 is formed on the nozzle tip 14. The tipped body 14 is provided with a left hand screw thread 19, the purpose of which will be hereinafter explained.

The threaded portion 19 of the nozzle tip threadedly engages a corresponding thread 19a formed in a sleeve member 20. On the outside of the sleeve member is formed a right hand screw thread 21, which threadedly engages corresponding threads formed in the body 11. The sleeve has an interior bore 20a providing clearance for a consequently easy passage for the valve retractor, to be presently described.

Formed in the threads 21 is an annular channel 22 which connects to the bore of the sleeve through a radial hole or holes 23. This annular channel is so located that when the sleeve is screwed down to the fullest extent, the channel coincides with the channel 12a and fuel entering through the channel 12a will flow into the annular channel 22 and hence to the interior of the sleeve 20.

In the interior of the body 11 is formed an internal shoulder 24 upon which is placed a washer 25. When the tip and the sleeve are screwed together, they can then be screwed into the holder or body 11 as a single unit to a point where the shoulder 17 abuts the shoulder 24 of the holder or body with the washer 25 therebetween. In order to facilitate the screwing in of this assembly, a hexagonal socket 26 is formed in the sleeve 20 which makes it possible to firmly screw the assembly into the body by means of a wrench or key.

It will be clearly seen that as soon as the shoulder tip bottoms on the washer 25, the tip will have a tendency to remain stationary. Therefore, as one continues to screw the sleeve downwardly, the tip will unscrew itself from the sleeve, due to the fact that the thread 21 is a right hand thread and the thread 19 on the tip is a left hand thread, with the result that the tipped shoulder 17 will be pressed down without appreciable tendency to rotate on the washer 25, thus tending to make a firm and liquid-tight seal.

My valve is in effect a simple ball check valve. The ball 27 is firmly held in a cavity formed in the end of a valve rod 28 so that the ball 27 can fall onto the seat 16 to effect a fluid-tight closure. When the ball 27 is inserted in the cavity, the edge of the cavity is rolled over so as to hold the ball therein. The shank of the valve rod has a plurality of longitudinal grooves 30 formed therein to provide easy passage for the fuel on its way from the body to the seat 16. A thread 31 is formed on the valve rod 28 and this thread fits the interior of the helical bellows 32 which is shown in elevation in Figure 3.

Above the threaded portion 31, the valve rod 28 has a straight shank 29. The bellows 32 is screwed onto the valve rod 28 in engagement with the threads 31 and then soldered to this rod at the bottom, the solder being shown at 32a in Figure 1. The straight shank portion 29 is slightly smaller in diameter than the interior of the bellows so as to provide a free clearance thereabout.

A bellows holder 34 has a threaded hole 34a, the threads of which are adapted to be engaged by the exterior of the upper end of the bellows, and communicating with the threaded hole 34 is a countersunk or conical hole 34b. When the upper end of the bellows 32 is screwed into the threaded hole 34a, it is positively held in a position in the ring 34 so that they may be soldered together by forming a solder ring 35, which is shown in Figure 1. In forming the solder ring 35 in the top ring 34, the threads facilitate the soldering operation because the two parts are held in proper relation and threads prevent mechanical strains in the solder, itself, because by this arrangement, the strain is taken up in the ring by the stem and by the bellows proper.

After the above operation, the valve rod 28, the bellows, and the top ring 34 form a single assembled unit which is inserted into the valve body in such a manner that the top ring 34 rests on a washer 33a, which is positioned on a shoulder 33 formed in the body 11. The washer 33a is preferably made of a porous metal which can be compressed into a solid formation so as to be yielding and yet fluid-tight and compressed.

This bellows unit is screwed down into the novel holder 11 by means of a threaded cylindrical body 36 which engages threads 36a formed in the body 11. It abuts the top ring or bellows holder 34 and presses it firmly down on the washer 33a and in turn, the washer is pressed on the seat 33 so that a liquid-tight connection is established. When this cylindrical body is firmly screwed down, there is, within the holder, a space totally closed off from the outside and which is adapted to contain fuel entering through the passage 12a. This fuel has no other means of escape except through the spray opening 15, which is kept closed by the ball 27. The bellows, which are slightly greater in length than the length of the space, and which are also springy, force the ball on its seat so that normally fuel cannot escape through the spray passage 15. If, however, the pressure in the interior of the body exceeds a certain amount (in accordance with the seating, as will be hereinafter explained) the bellows will be compressed and retract the ball 27 from its seat, thus opening the valve and causing the nozzle to spray.

Inside the threaded cylindrical body 36, is a cavity for a spring 37 which presses on the upper end 29 of the valve rod 28, via a disc 38a which has a shallow socket therein to accommodate the upper end of portion 29 of the valve rod. A screw 38 engaging a corresponding thread in the cylindrical body 36, has a shank which engages a disc 39. This screw is provided for compressing the spring 37 through a disc 39. On the upper end of the screw 38 is a lock nut 40 which may be loosened before any adjustment of the screw is to be made and which may be tightened after an adjustment is made in order to retain the adjustment, so that after the proper tension is placed on the valve rod, this adjustment can be positively retained. A closure cap 41 has internal threads 42 which may engage the threads on the cylindrical body 36 extending beyond the body on holder 11 with a washer 43 therebetween, and when this cap is placed thereon, all of the interior parts are sealed off from the atmosphere and the device is ready for installation.

In order for the nozzle to spray, the pressure of the fuel must be high enough to overcome the pressure exerted on the ball 27 by the spring 37 and by the bellows 32, thus the opening pressure can be regulated accurately by regulating the tension of the spring 37 by means of the screw 38 and locking the adjustment permanently by means of the nut 40.

Referring to Figure 7, the enlarged portion 11a of the body from which the boss 10 projects has oppositely disposed lugs 44 and 45, preferably formed integral therewith, and these lugs have holes 46 and 47, respectively, formed therein, for the purpose of mounting the nozzle on the device with which it is to be used.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed is:

1. In an injector nozzle for internal combustion engines, a body member, a stepped interior bore formed in said body with a shoulder therebetween, the portion of said bore of smaller diameter forming a fuel chamber, the other portion of said bore having its interior threaded, a passage in said body communicating with and terminating in a seat in said chamber, a valve stem carrying a valve member on one end thereof adapted to engage said seat, a boss on said body member having a fuel passage formed therein and adapted to be connected to a source of fuel under pressure, bellows-engaging means formed on said stem, a helical metallic bellows having one end engaging said bellows-engaging means and secured in fluid-tight relation to said stem, an annular member positioned on said shoulder with sealing means therebetween, another bellows-engaging means formed in the interior bore of said annular member, the other end of said bellows being engaged thereby and secured thereto to form a fluid-tight closure for said chamber, a cylindrical body threadedly engaging the threads formed in said body and forcing said annular member and the gasket against said shoulder, spring means in the interior of said cylindrical body for urging said valve member into fluid-tight engagement with said seat, a stepped interior bore in said cylindrical body having one portion containing said spring means and another portion of larger interior diameter, and a disc member positioned in said last portion and guided by the wall thereof, said disc member having said spring means in contact with its upper surface and having a counterbored hole extending into it from the lower surface thereof to receive the upper end of said valve stem for guiding and steadying the same.

2. In an injector nozzle for internal combustion engines, a body member the greater portion of which is generally tubular in form, the interior of said body being divided into two chambers closed at the opposite ends thereof, a boss on said body member having a passage formed therein communicating with one of said chambers termed a fuel chamber, a passage formed in the end of said fuel chamber substantially concentric therewith and terminating in a seat within said fuel chamber, a valve member in contact with said seat and having a stem extending through the fuel chamber and into the other chamber, elongated spirally formed bellows means connected to said stem within the confines of said fuel chamber and connected to a removable dividing wall in said other chamber, means in said last mentioned chamber for maintaining said dividing wall in fluid-tight relation with said fluid chamber, spring means concentric with said last mentioned means and acting against the end of said stem for maintaining the valve on said seat, said valve being adapted to be unseated by fluid entering said fuel chamber under sufficient pressure to overcome the urge of said spring means, said other chamber being larger in diameter than said fuel chamber with a shoulder therebetween, said dividing wall being seated on said shoulder with a gasket therebetween, said other chamber having internal threads which are engaged by cooperating threads formed on said means in said last mentioned chamber.

3. In an injector nozzle for internal combustion engines, a body member generally tubular in form, the interior of said body being divided into two chambers, one of which is larger in diameter than the other and termed larger chamber, thereby leaving an annular shoulder therebetween, a boss on said body member having a passage formed therein communicating with the smaller of said chambers termed a fuel chamber, the end of said fuel chamber opposite said shoulder having a hole formed therein smaller in diameter than said fuel chamber, thereby forming a second shoulder, a flanged bushing extending through said last hole and having its flange in fluid-tight relation with said second shoulder with a gasket therebetween, a passage extending axially through said bushing and terminating on a seat formed in said bushing, said passage communicating with said fuel chamber, a valve engaging said seat and having a stem extending therefrom concentric with said bushing and said chambers and terminating in said larger chamber, an annulus adapted to rest on said first shoulder and form a dividing wall between said fuel chamber and said other chamber, an elongated spiral flexible bellows connected to said stem in said fuel chamber and connected to said annulus to complete the fluid-tight closure of said fuel chamber, threads formed in the interior wall of said larger chamber, a cylindrical body having external threads thereon engaging said last mentioned threads for forcing said partition against said gasket on said first seat, spring means positioned within said cylindrical body and acting against the end of said stem with bearing means therebetween, a socket in said bearing means to receive the upper end of said valve stem for steadying and guiding the same, and screw means within said fuel chamber for forcing the flange of said bushing in fluid-tight relation with said second shoulder with gasket means therebetween.

4. In an injector nozzle for internal combustion engines, a body member generally tubular in form and having a fuel chamber formed therein of a predetermined diameter, an end wall on said body having a hole therein concentric with and smaller in diameter than said fuel chamber, thereby leaving a shoulder between said hole and the inner bore of said chamber, female threads formed at least in the upper portion of said fuel chamber, a flanged bushing extending through said hole and having its flange in engagement with a gasket positioned on said shoulder, a passage extending axially through said bushing and terminating on a seat formed in said bushing, said bushing having external threads formed thereon to one side of its flange, and a hollow sleeve having external threads near one end thereof adapted to engage the female threads formed in said chamber and having internal threads at the other end thereof adapted to engage the external threads on said flanged bushing for forcing the flange against said gasket and said gasket against said shoulder for forming a fluid-tight seal between said flange and said chamber, the passages in said sleeve and said flanged bushing being in concentric alignment to accommodate valving means adapted to cooperate with said seat, the threads formed on the exterior of the hollow sleeve near one end thereof and the threads formed on the interior of said sleeve at the other end thereof and the threads which they respectively engage being formed in opposite directions so that when the sleeve is rotated in one direction to remove it from the fuel chamber, the internal threads function to withdraw the flanged bushing from said chamber.

5. An injector nozzle according to claim 1, in which said helical metallic bellows is biased so as to exert a predetermined urge of said valve member against said seat so that the pressure necessary to raise said valve member off of its seat must be sufficient to overcome the force exerted by both said spring means and said bias.

6. In an injector nozzle for internal combustion engines, a generally tubular hollow body having an internal shoulder formed on the lower end thereof, a right hand thread formed in the interior wall of said body, a gasket washer positioned on said shoulder, a flanged bushing having its flange contacting said gasket and having a seat formed therein, a passage therein extending from said seat, left hand threads formed on said bushing adjacent to said flange, a sleeve having an external thread fitting said right hand thread and having an internal thread fitting said left hand thread, and a socket formed in the upper end of said sleeve to accommodate a socket wrench for rotating said sleeve.

7. In an injector nozzle for internal combustion engines, a generally tubular hollow body having an internal shoulder formed on the lower end thereof, a right hand thread formed in the interior wall of said body, a gasket washer positioned on said shoulder, a flanged bushing having its flange contacting said gasket and having a seat formed therein, a passage therein extending from said seat, left hand threads formed on said bushing adjacent to said flange, a sleeve having an external thread fitting said right hand thread and having an internal thread fitting said left hand thread, and means to rotate said sleeve to force said flange in fluid tight relation with said gasket without affecting the orientation thereof.

8. In an injector nozzle for internal combustion engines, a generally tubular hollow body having an internal shoulder formed on the lower end thereof, a right hand thread formed in the interior wall of said body, a gasket washer positioned on said shoulder, a flanged bushing having its flange contacting said gasket and having a seat formed therein, a passage therein extending from said seat, left hand threads formed on said bushing adjacent to said flange, a sleeve having an external thread fitting said right hand thread and having an internal thread fitting said left hand thread, a socket formed in the upper end of said sleeve to accommodate a socket wrench for assembling and disassembling said nozzle, said internal threads functioning to withdraw said flanged bushing from said gasket when said sleeve is rotated in a direction to remove it from said body.

THEODORE H. NAKKEN.

REFERENCES CITED

The following references are of record in the file of this patent:

UNITED STATES PATENTS

| Number | Name | Date |
|---|---|---|
| 1,301,719 | Lloyd | Apr. 22, 1919 |
| 1,360,833 | Vuilleumier | Nov. 30, 1920 |
| 1,564,849 | Hesselman | Dec. 8, 1925 |
| 1,973,666 | Sidney | Sept. 11, 1934 |
| 2,391,808 | Vincent | Dec. 25, 1945 |
| 2,395,810 | Green | Mar. 5, 1946 |

FOREIGN PATENTS

| Number | Country | Date |
|---|---|---|
| 9,131 | Great Britain | Apr. 18, 1912 |
| 97,829 | Austria | Sept. 10, 1924 |
| 447,743 | Great Britain | 1936 |
| 591,559 | Germany | Jan. 23, 1934 |